(12) United States Patent
Dale et al.

(10) Patent No.: US 6,323,249 B1
(45) Date of Patent: Nov. 27, 2001

(54) MACROPOROUS RESINS HAVING LARGE PORES BUT WITH HIGH CRUSH STRENGTH

(75) Inventors: James A. Dale, Wales (GB); Lorenzo M. Tavani, Milan (IT); Lawrence S. Golden, Wales (GB)

(73) Assignee: Purolite International, Ltd., Wales (GB)

(*) Notice: Subject to any disclaimer, the term of this patent is extended or adjusted under 35 U.S.C. 154(b) by 0 days.

(21) Appl. No.: 08/291,572

(22) Filed: Aug. 16, 1994

Related U.S. Application Data

(63) Continuation of application No. 07/972,717, filed on Nov. 6, 1992, now abandoned, which is a continuation-in-part of application No. 07/578,333, filed on Sep. 6, 1990, now abandoned, which is a continuation-in-part of application No. 07/249,297, filed on Sep. 26, 1988, now abandoned.

(51) Int. Cl.[7] ................................................. C08J 5/20
(52) U.S. Cl. ............................. 521/38; 521/28; 521/33
(58) Field of Search .............................. 521/28, 38, 33

(56) References Cited

U.S. PATENT DOCUMENTS

| | | | |
|---|---|---|---|
| 3,454,493 | * | 7/1969 | Kien ........................................ 521/28 |
| 3,767,600 | * | 10/1973 | Albright ................................. 521/38 |
| 4,256,840 | * | 3/1981 | Meitzner et al. ....................... 521/33 |
| 4,501,826 | * | 2/1985 | Meitzner et al. ....................... 521/29 |
| 4,818,773 | * | 4/1989 | Cornette et al. ....................... 521/32 |

FOREIGN PATENT DOCUMENTS

| | | | |
|---|---|---|---|
| 1918399 | * | 12/1970 | (DE) ...................................... 521/38 |
| 0135292 | * | 3/1985 | (EP) . |

\* cited by examiner

Primary Examiner—Thurman K. Page
(74) Attorney, Agent, or Firm—Keil & Weinkauf

(57) ABSTRACT

Crosslinked macroporous resins and ion-exchange resins produced therefrom which have a significantly high crush strength to be useful in the removal of colloidal silica, iron, aluminum and other metal hydroxides and a process for producing macroporous resins with this high crush strength yet having extremely large pores by achieving a narrow distribution of pore sizes.

10 Claims, 2 Drawing Sheets

MACROPOROUS RESINS HAVING LARGE PORES BUT WITH HIGH CRUSH STRENGTH

This application is a continuation of application Ser. No. 07/972,717, filed on Nov. 6, 1992, now abandoned which is a CIP of Ser. No. 07/578,333, filed on Sep. 6, 1990, now abandoned which is a CIP of Ser. No. 07/249,297, filed on Sep. 26, 1988 now abandoned.

FIELD OF INVENTION

The invention relates to crosslinked macroporous resins and ion-exchange resins produced therefrom which are strong enough to be useful in the removal of colloidal silica and the removal of iron, aluminum and other metal hydroxides from aqueous media containing the same. More particularly, this invention relates to a process for producing a macroporous resin having extremely large pores along with higher pore volume, higher crush strength and a narrower pore distribution than such macroporous resins heretofore known in the art.

BACKGROUND OF THE INVENTION

Methods of preparing crosslinked polymers, and anion and cation exchange resins derived therefrom, which are characterized by macroporous structures and which show improved properties compared to traditional gel resins, are known. In contrast to conventional gel resins formed by copolymerization of monovinylidene and polyvinylidene monomers and characterized by the presence of micropores, the pore structure being the distance between the crosslinked polymeric chains, macroporous resins contain a significant nongel porosity in addition to normal gel porosity. This nongel porosity arises from channels present between the gel lattice. These microscopic channels are separate and distinct from the micropores, which are present in all crosslinked copolymers, as is well known to those skilled in the art. While the channels are themselves relatively small, they are large when compared with the micropores of the prior art, gel type resins.

A number of patents have issued on macroporous resins and various methods for generating macroporosity. The terms macroporous, macroreticular, sponge-like and channelled have been used, more or less interchangeably, by those skilled in the art to characterize the opaque beads and resins. Pore-forming, phase-separating, precipitant and porogen have, likewise, been used to refer to the agent used to produce the macroporous structure.

British Patent 785,157 and U.S. Pat. No. 3,122,514 disclose the use of pre-polymerized styrene dissolved in mixtures of divinylbenzene, styrene and a polymerization initiator yielding opaque beads with microchannels and pores through which molecules can diffuse more readily than in conventional resins. Ion exchange resins prepared from these copolymer beads are disclosed in British Patent 785,157 as being much more resistant to shock, superior as anion exchangers in color removal and, as cation exchangers, were directly hydratable after sulfonation with little or no breakage. However, this technology did not improve resistance to oxidative de-crosslinking of the polymeric matrix itself and introduced the problem of leaching of the original linear polystyrene additive in cation exchange products produced by this process. That is, the linear polymer chains, which are not crosslinked, become on sulfonation at least partially water soluble and leach from the resin, causing contamination of any fluid passing through the resin. Such resins not only contaminate the fluids they were intended to purify but also process fluids, which affects production economics adversely since reagents cannot be recycled. Moreover, environmental pollution must be addressed. In the process of U.S. Pat. No. 3,122,514 linear polystyrene is either formed-in or dissolved-in the styrene monomer mix which is thereafter polymerized. The linear polystyrene that is tangled into the crosslinked copolymer bead is then leached out of the bead leaving channels through the bead.

U.S. Pat. Nos. 3,367,889 and 3,627,708 disclose a system whereby an emulsion of water in styrene-divinylbenzene is polymerized as droplets in a surrounding aqueous suspension. These patents disclose the use of water in combination with a surfactant as the porogen in forming macroporous resins.

U.S. Pat. Nos. 4,221,871, 4,224,415, 4,256,840 and 4,501,826 are each directed to methods of preparing crosslinked macroreticular resins, containing at least one monovinylidene and a polyvinylidene monomer, which are phase separated by the use of a precipitant in the monomer mixture during aqueous suspension polymerization. The precipitant is disclosed as being either a liquid or solid in its natural state, the preferred class of precipitants being liquid under the polymerization conditions. Suitable precipitants are materials which are solvents for the monomers being copolymerized but exert essentially no solvent action on the copolymer. Examples include butanol, sec-butanol, tert-amyl alcohol, 2-ethylhexanol and decanol. By adding the precipitant to the monomer phase, the solubility of the. copolymer formed is decreased and the copolymer separates from the monomer phase as it is formed. This phenomenon is referred to as 'phase separation'. As the concentration of monomer in the polymerizing mass decreases due to polymerization and as the concentration of the precipitant increases thereby, the newly formed polymer is more strongly repelled.

U.S. Pat. No. 3,454,493 discloses macroreticular resins achieved by copolymerizing monoethylenically unsaturated monomers with polyvinylidene monomers in the presence of a precipitant by the phase-separating technique as defined heretofore. The anion exchange resins subsequently formed are characterized by having average pore diameters in the range of 10,000 to about 500,000 Angstroms. The Example set forth in this patent discloses a macroreticular resin having a range of pore diameters from 30,000 to 200,000 Angstroms and a mean pore diameter of 70,000 Angstroms. The macroreticular anion exchange resin is claimed to remove colloidal particulate matter from aqueous media.

European Patent Application 0,135,292 discloses crosslinked macroporous resins using water-soluble polymeric porogens (such as poly (vinyl methyl ether) which are soluble in polymerizing monomers under the conditions of polymerization and which are at least partially soluble in water under certain physical conditions to facilitate removal following polymerization. After separation of the resulting copolymer from the mixture, any remaining porogen is extracted with water as solvent. The polymeric porogens disclosed in the European Patent Application are described as being more effective porogens at lower levels than polystyrene porogens or other precipitants previously used in the art as porogens, yielding greater porosities. The resulting resins are disclosed as having a mean pore radius as high as 2,052 Angstoms.

SUMMARY OF THE INVENTION

A process has now been discovered by which macroporous resins may be produced which exhibit desirable properties not present in prior art macroporous resins. The nature of the pore distribution of these prior-art resins was such that the resins were physically very weak. As a result, potential users of ion exchange processes for the removal of colloidal matter chose alternative methods such as 'reverse osmosis'. The macroporous resins produced by the novel process have extremely large-sized pores, but their narrower distribution of pore sizes gives them sufficiently high crush strength for most, purposes. This narrower pore distribution also results in the bulk of the resin's porosity being in the useful size range for removal of colloidal matter, thereby increasing its effectiveness in this respect.

The resins may be sulfonated to form cation exchange resins or, alternatively, may be chloroalkylated and subsequently aminated to form anion exchange resins. Both weak and strong base anion exchangers are encompassed by the invention, strong base anion exchange resins being preferred for the removal of colloidal silica and other such colloidal matter from aqueous media.

BRIEF DESCRIPTION OF THE DRAWINGS

Drawing

DETAILED DESCRIPTION OF THE INVENTION

Figure 1:
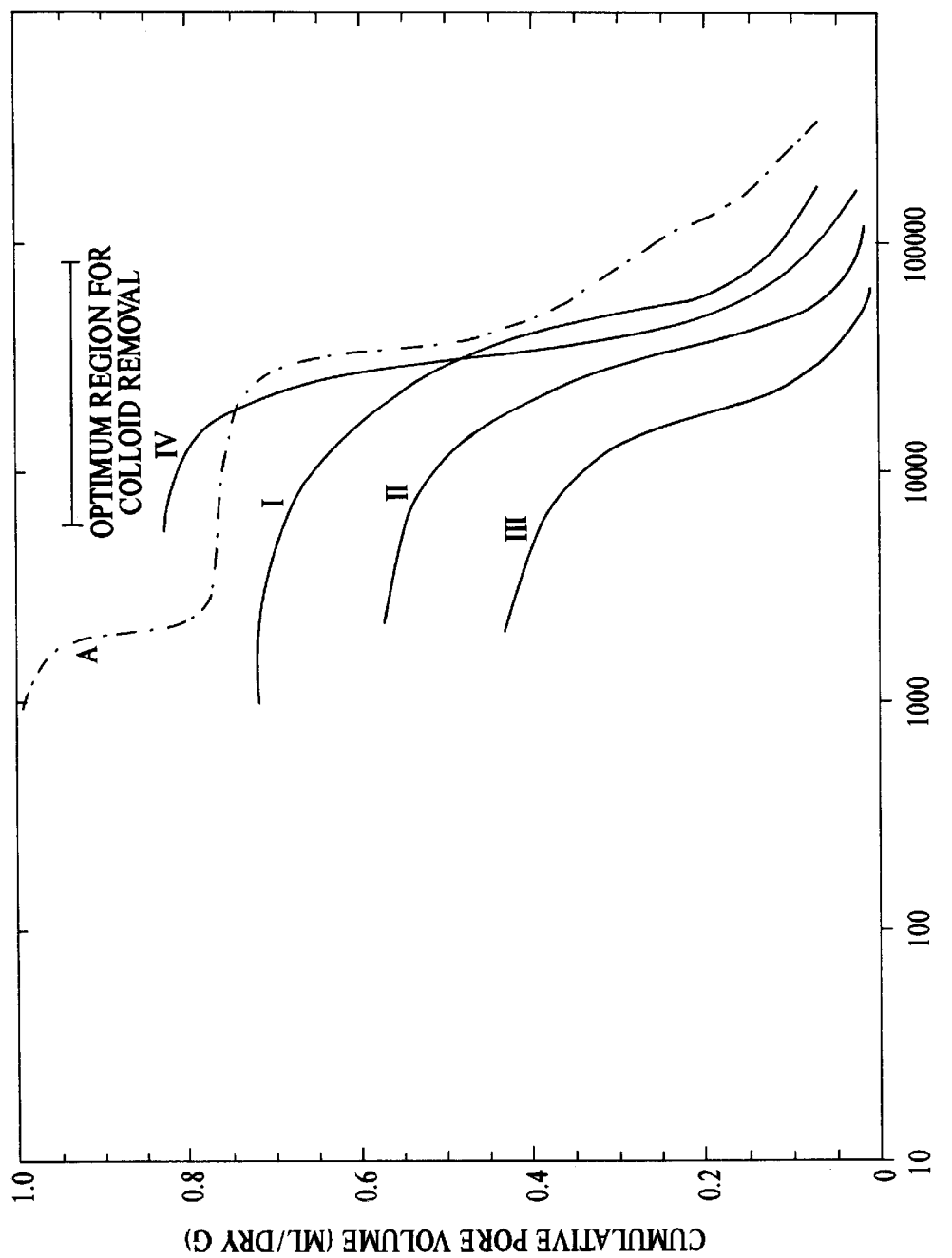
FIGS. 1 and 2 show mercury-intrusion curve of macroporous resins produced by the process of the invention compared to mercury-intrusion curves of prior art macroporous resins.

The process used to produce macroporous resins having extremely large pore size, narrower pore distribution, and greater crush strength, and having an increased ability to remove colloidal materials is achieved by copolymerizing monoethylenically unsaturated monomers with polyvinylidene monomers in the presence of relatively moderate amounts of a water-soluble polymeric porogen.

The porogen used in the present invention is a poly (alkylene oxide), most preferably a copolymer of ethylene oxide and propylene oxide, i.e. poly(ethylene oxide co-propylene oxide). It is also advantageous to polymerize the mixture in the presence of toluene as an additional component. Toluene being present in an amount of from 20 to 90 pph by weight.

Useful monoethylenically unsaturated monomers include styrene, vinyltoluene, methyl-styrene, tertiary butyl styrene, vinyl pyridine, 2-methyl-5-vinyl pyridine, vinylidine chloride, tetrafluoroethylene, vinyl acetate, vinyl stearate, vinyl bromide, vinyl anisole, vinyl naphthalene, acrylic and methacrylic esters and other derivatives. Styrene is preferred.

Useful polyvinylidene monomers for use as a crosslinking agent include divinylbenzene, diisopropenylbenzene, ethyleneglyocol dimethacrylate, hexanediol diacrylate, allyl methacrylate, divinyl ketone, divinyl sulfone, trimethylolpropane, trimethacrylate and trivinylbenzene. Divinylbenzene being preferred. The divinylbenzene being present in an amount of from 2 to 100%, more preferably 2 to 16%.

In a preferred embodiment, styrene, divinyl benzene and the porogen are mixed together with a polymerization initiator to form the monomer solution. Free radical initiators are most desirable. Free radical generating compounds which may be used to effect polymerization of the monomers include peroxides such as benzoyl peroxide, lauoryl peroxide, tertiary-butyl peroxide, hydrogen peroxide, percompounds such as potassium persulfate, sodium perborate and ammonium persulfate and azocompounds such as azobisisobutyronitrile, 2,2-azobis-(2-methylbutyronitrile), 2-t-butylazo-2-cyano propane. Suitable concentrations are from 0.01 to 5.0%, more preferably 0.02 to 3.0%. The monomer phase is added to an aqueous phase for suspension polymerization of the monomers. Salt may be added to the aqueous phase to decrease the water solubility of the monomers.

Various suspension agents and stabilizers such as polyvinylalcohol, methyl cellulose, carboxymethyl cellulose, hydroxyethyl cellulose, poly(vinyl pyrrolidine), polyacrylate salts, polymethyacrylate salts, dimethyldialkylammonium polymers, nitrite and dichromatic salts, calcium phosphate salts, carbonate salts, sulfate salts, bentonite clays, gum arabic, lignosulfonates, gelatine and xanthan gums in amounts ranging from 0.01 to 0.5% by weight of the monomers may be added to the aqueous dispersion to aid in maintaining the monomers dispersed as droplets while polymerizing the same as beads.

The mixture is heated at 7° C. to 90° C. for from 6 to 15 hours filtered, washed and dried. Following filtration, washing and drying, the crosslinked copolymer resin can be sulfonated with sulfuric acid, oleum, sulfur trioxide or chlorosulfonic acid as the sulfonating agent to form a cation exchanger or, alternatively, it may be chloroalkylated and subsequently aminated to form-an anion exchanger.

A wide variety of amines including primary, secondary and tertiary alkylamines or arylamines can be employed in the amination reaction. Polyalkylenepolyamines such as ethylenediamine, diethylenetriamine, triethylenetetramine, tetraethylenepentamine and propylenediamine can also be used. Aminoalcohols and dimethylaminoethanol are also useful. A preferred embodiment employs a trialkylamine as the aminating agent, producing a quaternary anion exchanger. Generally, the alkyl radical does not contain more than 4 carbon atoms.

When the resin is to be employed for the removal of colloidal silica and other such colloidal particulate matter, a strong base anion exchange prepared with trimethylamine resin is preferred. Although resins with a strong base functionality are preferred for the removal of colloidal silica and other such colloidal particulate matter, weak base anion exchange resins having the same macroporous structure will also perform. Such weak base anion exchange resins are prepared in the same manner as the strong base resins with the exception that the trimethylamine is replaced with dimethyl amine, diethyl amine, monomethyl amine, ethanol amines etc. These weak base anion exchange resins, aside from the differences in ion exchange functional groups, are essentially identical in morphological structure as the strong base anion exchange resins, particularly in regard to their large pore sizes.

Methods of producing ion-exchange resins from corresponding crosslinked copolymer resins are known in the art. Anion exchange resins produced by chloromethylating polystyrene and subsequently aminating are disclosed in U.S. Pat. Nos. 2,591,573; 2,591,574; 2,616,099; 2,616,877; 2,629,710; 2,631,999; 2,632,000; 2,642,417; 2,725,361; 2,794,785; 3,422,160; 3,311,602; 2,953,547; 4,225,677; and 3,425,990. Strongly acid cation exchangers obtained by sulphonation of crosslinked polymers, such as for example crosslinked polystyrenes are disclosed in U.S. Pat. Nos. 2,366,007, 2,466,675, 2,500,149, 2,631,127 and 2,664,801.

The present invention makes possible the removal of colloidal particulate matter, such as silica, by providing novel macroporous resins characterized by pore diameters ranging in size from 5,000 to 100,000 Angstoms and having particularly high crush strength and high pore volume. The anion exchange resins can be used by themselves for removing colloids or particulate matter, such as colloidal silica or hydrous oxides, or can be used in conjunction with cation exchange resins so as to simultaneously achieve deionization and colloidal removal. In addition, the anion exchange resins of the invention are capable of effectively removing acids of relatively high molecular weight such as, for example, humic acid, and are capable of removing viruses from aqueous solutions. Also, non-functionalized, macroporous resins formed by the inventive process are useful in sorption processes and in molecular sieve type applications.

As previously stated, the pore structure of macroporous resins is formed by voids or channels between the polymer lattice work. The pore structure has been found to have a characteristic pore distribution and range. while numerous methods of pore measurement have been applied to macroporous resins, characterization by the mercury-intrusion technique, particularly within a series, has been found to be direct and consistent. The mercury-intrusion method has long been used to find the distribution of sizes of capillary pores in a porous solid by forcing in mercury, the radius being found from the pressure and the percentage from the volume of mercury absorbed at each pressure. The method is based on the relationship that the pressure required to force pure mercury into a capillary of diameter d is $(-4 \sigma \cos \theta)/d$, where$\sigma$ is the surface tension of mercury and $\theta$ is the contact angle of mercury with the porous solid (Proc. Nat. Acad. Sci. U.S.A. (1921) 7:115). Since, for a particular solids the surface tension and the contact angle are constants, penetration of mercury into the pores, at a known pressure, indicates the corresponding pore diameter while the amount of mercury intruded, indicates the porosity or volume of pores of a given diameter.

The large pore sizes and the narrower pore size distributions of the greatly improved resins produced by the inventive process, as illustrated in the following examples, are demonstrated by measurements using this technique. The mercury-intrusion curves of the resins described in the examples are shown in the drawing FIGS. Also shown, by way of comparison, is the mercury-intrusion curve of the prior art resin, according to U.S. Pat. No. 3,454,493 (resin A) using a 1.0/1.0 volume ratio of tertiary-amyl alcohol to monomers. The Table collects the chemical and porosity characteristics of the resins prepared according to these examples along with data for resin A by comparison. The width of the pore size distribution is illustrated by the radii outside which 10% of the pores lie, the proportion of the total pore volume which lies within the desired range, and the standard deviation of the pore distribution (S.D.) which is only approximate due to the skewed nature of all the distributions. The higher crush strength of the resins prepared according to the invention is illustrated by the Chatillon values.

Figure 2:
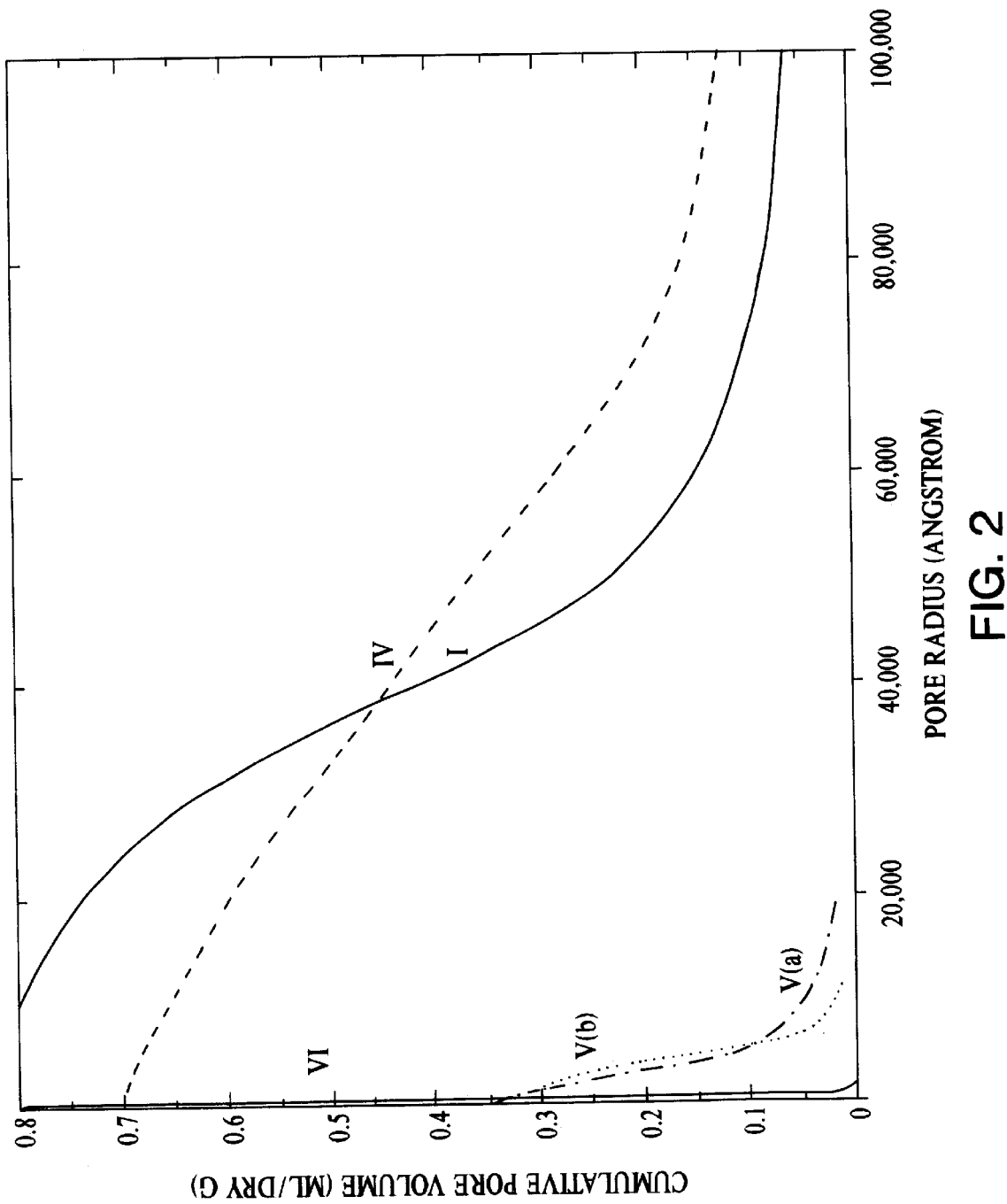

FIG. 1 is a standard Hg-intrusion plot, logarithmic in pore size in order to cover the full 37 to 3,000,000 Angstrom range. This representation gives a compressed impression: for example, the first logarithmic cycle of 90 A (10–100 A) appears just as large as the 90,000 A fourth cycle (10,000–100,000 A). Separations at the lower end of the region appear similar to those at the higher end, which have been contracted by factors of ten. FIG. 2 is linear in pore size, clearly showing the surprisingly extensive differences between using nineteen and twenty parts per hundred porogen (curves V (b) and V (a) versus I). Curve VI shows that using the same volume of heptane as the prior art tertiary-amyl alcohol does not produce anything near colloidal-sized pores. Using the same volume of toluene as the prior art tertiary-amyl alcohol produces clear gel beads. It has been long known from the literature that macroporosity does not occur at all with good-swelling solvents until high amounts of crosslinking agents are employed, minimally around 18% divinylbenzene: J. R. Millar et al., J. Chem Soc., 33, 218ff (1963).

EXAMPLE I

A solution of 131 g poly(alkylene oxide) (ethylene oxide, propylene oxide), 93 ml 63% divinylbenzene, 626 ml styrene and 1.6 g 1,1'-azobiscyclohexane-carbonitrile was added to a suspension of 1350 ml water, 119 g salt, 38 g tri-sodium orthophosphate-12 $H_2O$, 2.6 g lignosulphate, 6.8 g hydroxyethyl cellulose and 57 g calcium chloride-2 $H_2O$. The mixture was heated at 88° C. for 5 hours and 95° C. for 2 hours.

The solid, opaque copolymer was filtered, washed and dried. Chloromethylation, followed by amination with trimethylamine, produced a strong base Type I anion exchange resin having the characteristics shown in the Table (resin I).

EXAMPLE II

The polymerization was run again, as in Example I, except that the temperature was maintained at 87° C. throughout for 7 hours, and the monomer mixture comprised 175 g of the poly(alkylene oxide), 89 ml of divinylbenzene, 671 ml styrene and 1.75 g of the initiator. The derived strong base Type I anion exchange resin had the characteristics shown in the Table (resin II).

EXAMPLE III

The polymerization was carried out essentially as in Example II, except with a mixture of 369 g poly(alkylene oxide), 94 g divinylbenzene, 1383 g styrene and 3.61 g initiator. The derived strong based Type I anion exchange resin had the characteristics shown in the Table (resin III).

EXAMPLE IV

A mixture of 184 g poly(alkylene oxide), 71 g 63% divinylbenzene, 486 g styrene, 167 g toluene and 2.23 g initiator was polymerized as in Example II. The derived strong base Type I anion exchange resin had the characteristics shown in the Table (resin IV).

(Reference) EXAMPLE V (a) A solution of 41.5 g of 63% pure divinylbenzene, 612.5 g styrene, 1.64 g 1,1-azobiscyclohexane-carbonitrile and 124.3 g poly (alkyleneoxide) (19 pph by weight) was polymerized in suspension at 88° C. for 7 hours. The copolymers were drained on a screen, washed with water, dried; a small sample was vacuum dried below 30° C. and analyzed by mercury-intrusion.

(b) The copolymer was functionalized by chloromethylation followed by animation with trimethylamine: 4.18 meq/g (dry), 1.16 eq/l (wet), 59.5% moisture.

(Reference) EXAMPLE VI

A mixture of 36.3 g of 63% pure divinylbenzene, 249.7 g styrene, 5.15 g of 75% pure benzoylperoxide, and 215 g heptane (75 pph or 1.1 ml/g or 1.0 ml/ml) was polymerized in suspension at 78° C. for 8 hours. The beads were air and then vacuum dried below 30° C. for Hg-intrusion: 0.86 ml/g total pore volume and mean pore radius of 300 Angstroms.

The Hg-intrusion plot shown in FIG. 1 is logarithmic in pore size in order to cover the full 37 to 3,000,000 Angstrom range. This representation gives a compressed impression. For example, the first logarithmic cycle of 90 Å (10–100 Å) appears just as large as the 90,000 Å fourth cycle (10,000–100,000 Å). Separations at the lower end of the region appear similar to those at the higher end, which have been contracted by factors of ten. The Hg-intrusion plot shown in FIG. 2 is linear in pore size, clearly showing the surprisingly extensive differences between using nineteen and twenty parts per hundred porogen (curves V (b) and V (a) versus IV). Curve VI shows that using the same volume of heptane as the prior art tertiary-amyl alcohol, does not produce anything near colloidal size pores. Using the same volume of toluene as the prior art tertiary-amyl alcohol, produces clear gel beads. In this regard, it has been long known from the literature that macroporosity does not occur at all with good swelling solvents, e.g. toluene, until high amounts of crosslink are employed, minimally around 18% divinylbenzene, J. R. Millar et al., *J. Chem. Soc.*, 33 218ff (1963).

TABLE

| | RESIN I | RESIN II | RESIN III | RESIN IV | RESIN A |
|---|---|---|---|---|---|
| eq/kg (dry) | 3.95 | 3.63 | 3.98 | 3.58 | 3.80 |
| eq/l (wet) | 1.17 | 1.14 | 0.97 | 0.99 | 0.70 |
| % moisture retention | 57.4 | 55.0 | 63.8 | 59.8 | 73.0 |
| chatillon value (g/bead) | 78 | 45 | 24 | 27 | <10 |
| porosity data (Angstrom) | | | | | |
| radius BELOW which 10% of distribution lies | 10,000 | 6,500 | 8,500 | 16,500 | 1,700 |
| radius ABOVE which 10% of distribution lies | 170,000 | 50,000 | 40,000 | 65,000 | 235,000 |
| mean pore radius | 35,000 | 29,000 | 15,500 | 30,500 | 31,000 |
| S.D. of distribution | 30,000 | 20,000 | 7,000 | 10,000 | 70,000 |
| total pore volume (ml/dry g) | 0.70 | 0.56 | 0.40 | 0.87 | 0.97 |
| pore volume between 5,000 and 100,000 Angstroms | 0.60 | 0.50 | 0.37 | 0.84 | 0.56 |
| % usable pore volume | 85 | 89 | 92 | 93 | 58 |

We claim:

1. A process of producing a crosslinked macroporous resin which includes high strength with high porosity, wherein the pore radii range from 2,000 to 100,000 angstroms, the pore volume is at least 0.36 ml/g (dry), the crush or chatillon value is at least 24 g bead (710μ size), said method comprising polymerizing a solution of (1) a monoethylenic monomer, (2) a polyethylenic monomer, (3) a free-radical initiator, and (4) 20–40 pph poly(alkylene oxide) pore-forming agent or a mixture of the 20–40 pph poly(alkylene oxide) pore-forming agent with toluene.

2. The process of claim 1 wherein said polymerization is conducted in an aqueous suspension to obtain copolymers in bead form.

3. The process of claim 1 wherein the poly(alkylene oxide) is a copolymer of ethylene oxide and propylene oxide.

4. The process of claim 1 wherein the toluene is present in the range of 20–40 pph.

5. The process of claim 1 wherein the poly(alkylene oxide) is present from 20–33 pph.

6. The process of claim 1 followed by sulfonation to form a strong-acid cation-exchange resin.

7. The process of claim 1 and subsequent chloromethylation then amination, forming basic anion-exchange resins.

8. The copolymer resins consisting essentially of the product of the process of claim 1.

9. The cation resins produced by the process of claim 6.

10. The anion resins produced by the process of claim 7.

* * * * *

UNITED STATES PATENT AND TRADEMARK OFFICE
CERTIFICATE OF CORRECTION

PATENT NO.     : 6,323,249 B1
DATED          : November 27, 2001
INVENTOR(S)    : Dale et al.

It is certified that error appears in the above-identified patent and that said Letters Patent is hereby corrected as shown below:

Column 8,
Line 17, "2,000" should be -- 5,000 --.

Signed and Sealed this

Twenty-fourth Day of December, 2002

JAMES E. ROGAN
*Director of the United States Patent and Trademark Office*